United States Patent [19]
Schmidt, Jr. et al.

[11] 3,867,291
[45] Feb. 18, 1975

[54] APPARATUS FOR CLEANING FILTERS

[75] Inventors: Henry Schmidt, Jr., Hinsdale; Bruce Durham, Berwyn, both of Ill.

[73] Assignee: Industrial Filter & Pump Mfg. Co., Cicero, Ill.

[22] Filed: Jan. 12, 1973

[21] Appl. No.: 323,329

[52] U.S. Cl. .............. 210/139, 55/96, 55/300, 55/304, 137/624.14, 210/141, 210/332
[51] Int. Cl. ............................. B01d 35/16
[58] Field of Search ....... 55/300, 96, 292, 293, 304; 91/335; 137/624.14, 110, 624.11, 625.48; 210/332, 338, DIG. 18, 22, 139, 141

[56] References Cited
UNITED STATES PATENTS

| | | | |
|---|---|---|---|
| 2,123,473 | 7/1938 | Meston | 55/112 |
| 3,053,031 | 9/1962 | Vedder et al. | 55/304 X |
| 3,385,166 | 5/1968 | Kroffke | 137/624.14 X |
| 3,399,777 | 9/1968 | Passalaqua | 210/332 |
| 3,570,217 | 3/1971 | Steuernagel | 55/300 X |
| 3,587,213 | 6/1971 | Tamny et al. | 55/300 |
| 3,614,965 | 10/1971 | Metivier | 137/624.14 X |

Primary Examiner—Frank A. Spear, Jr.
Assistant Examiner—Robert G. Mukai
Attorney, Agent, or Firm—Edmond T. Patnaude

[57] ABSTRACT

Filter cake is dislodged from a filter element by vibrating the element at a plurality of different frequencies and amplitudes to develop a modulated wave pattern in the element.

9 Claims, 8 Drawing Figures

APPARATUS FOR CLEANING FILTERS

The present invention generally relates to the removal of filter cakes from porous filter elements on which the cakes are deposited, and it relates more particularly to a new and improved method and apparatus for developing wave patterns of varying frequency and amplitude in the filter elements to dislodge the filter cakes therefrom.

BACKGROUND OF THE INVENTION

It is well known in the art to vibrate, impact or shake filter elements to remove the filter cakes therefrom. For example, U.S. Pat. No. 3,212,643 discloses a system wherein a reciprocatory impactor is directly connected to a bank of filter leaves to develop vibrational waves in the filter leaves during the cleaning cycle. While such systems perform well for most applications, they do subject the filter leaves to substantial stress which, in some cases, prematurely shortens the lives of the leaves. This is particularly true when long periods of vibration are required to remove sticky types of cakes which tenaciously adhere to the leaves or where the operator permits excessively long vibration periods.

The object of leaf vibration is to impact sufficient shaking motion to the leaf assembly to dislodge the filter cakes with the least amount of strain on all of the components including the leaves themselves. There are, however, many factors affecting the most desirable frequency and amplitude of the vibration to be designed into the system. Some of these factors can be controlled, some can be predicted with reasonable accuracy, but some are neither controllable, nor predictable. For example, some of the factors that enter into the efficiency of operation of a vibration type cake removal operation are mass, inertia, frequency, amplitude, harmonics, time, cake characteristics including dry solids percent and tenacity, cake support media, cake formation pressures, leaf construction and the leaf suspension system.

When vibrating filter leaves for purposes of cake removal using the prior art methods and apparatus, it has been necessary to design into the system a frequency and amplitude of vibration which is optimum for the entire leaf assembly as it is expected to used. Since, however, not two leaves are identical, no particular combination of frequency and ampltiude is best for all of the leaves, and the vibration period must be sufficiently long to clean that leaf in the assembly which is being cleaned with the least efficienncy. Moreover, any particular combination of frequency and amplitude is not best for all parts of given filter leaf whereby the filter cake is more quickly dislodged from some parts of the leaf than it is from others. In addition to requiring longer vibration periods, this latter problem causes the filter cakes to fall off in sections rather than as large unitary pieces which are less likely to hang up on other parts of the filter or becomes trapped between adjacent leaves.

OBJECT OF THE INVENTION

A principal object of the present invention is, therefore, to provide a new and improved method and apparatus for vibrating filter elements to remove filter cakes therefrom.

Another object of this invention is to provide a method and apparatus for removing filter cake from filter elements by imparting to the filter elements a mechanical waveform made up of a plurality of successively different frequencies and amplitudes.

A further object of the present invention is to provide new and improved pneumatic control means for successively supplying air at a plurality of different pressures to a vibrator, the periods during which each of said pressures are supplied being adjustable, and the pressure valves also being adjustable.

SUMMARY OF THE INVENTION

Briefly, the above and further objects may be relaized in accordance with the present invention by connecting a vibrator to a filter leaf assembly and controlling the vibrator to impart to the leaf assembly a vibrational wave made up of successively different frequencies and amplitudes to provide more efficient cake removal by reducing the required vibration time and, in addition, reducing the time during which those frequencies and amplitudes which may be destructive to certain parts of the system are applied. By utilizing a control system wherein the different frequencies and amplitudes and the periods of duration are adjustable, maximum efficieny for each different combination of factors peculiar to each installation may be achieved.

BRIEF DESCRIPTION OF THE DRAWINGS

Further objects and advantages and a better understanding of the invention may be had from the following detailed description taken in connection with the accompanying drawings, wherein.

DETAILED DESCRIPTION OF THE INVENTION

Figure 3:
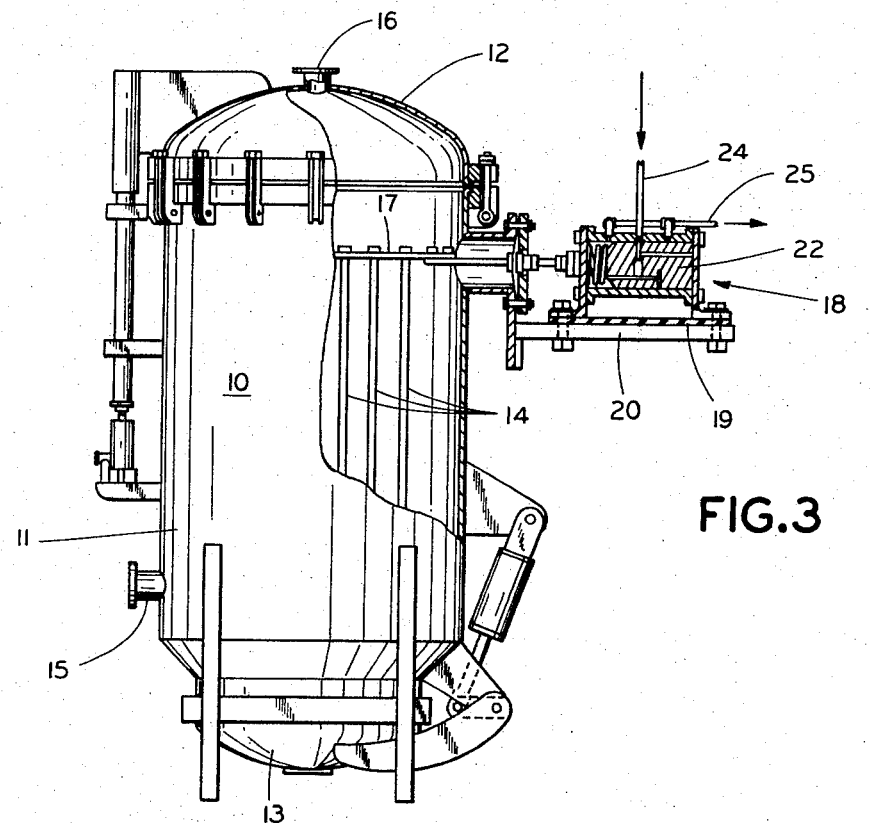
FIG. 3 is an elevational view, partly in section, of a filter and vibrator forming a part of the filter leaf vibration system of the present invention.

Referring now to the drawings and particularly to FIG. 3 thereof, a filter 10 comprises as its principal elements a tank 11 having a removable top cover 12 sealably mounted over the top thereof, a removable bottom cover 13 sealably mounted over the bottom thereof, a plurality of filter leaves 14, an outlet manifold system 15 to which the cavities in the leaves 14 are connected, an inlet port 16 in the cover 12, and a vibration system including a rigid bar 17 fixedly connected to each of the leaves 14 and to a vibrator 18 mounted over a shock absorber means 19 on a platform 20 mounted by the tank 11. The filter 10 and the associated leaf vibration system are described in greater detail in U.S. Pat. No. 3,212,643.

The vibrator 18 as shown in the drawing is of the reciprocatory impactor type wherein a piston 22 is moved back and forth into sharp, impacting engagement with the associated housing to impact vibrational shock waves to the bar 17 and thus to the leaves 14 in response to the supply of air thereto through an inlet conduit 24. Air exits the vibrator housing through an outlet 25. It should be understood that use of the present invention is not limited to the impactor type vibrator but it finds application with those types of vibrators which produce a generally sinusoidal wave pattern.

In order to controllably operate the vibrator 18, there is provided in accordance with the present invention a pneumatic control system for supplying air to the vibrator 18 at a plurality of different pressures thereby causing the piston 22 to reciprocate at correspondingly different frequencies and to reciprocate the bar 17 at different frequencies and amplitudes. Considered more particularly, and with reference to FIGS. 1–5, air at a sutable pressure of, say, 100 p.s.i. is supplied through an air filter 27 to an adjustable pressure regulator 28 and through an air lubricator 29 to a quick opening starting valve 30. As illustrated, the valve 30 is manually operated but an automatic type of remotely controlled quick opening valve may be used if desired.

Figure 4:
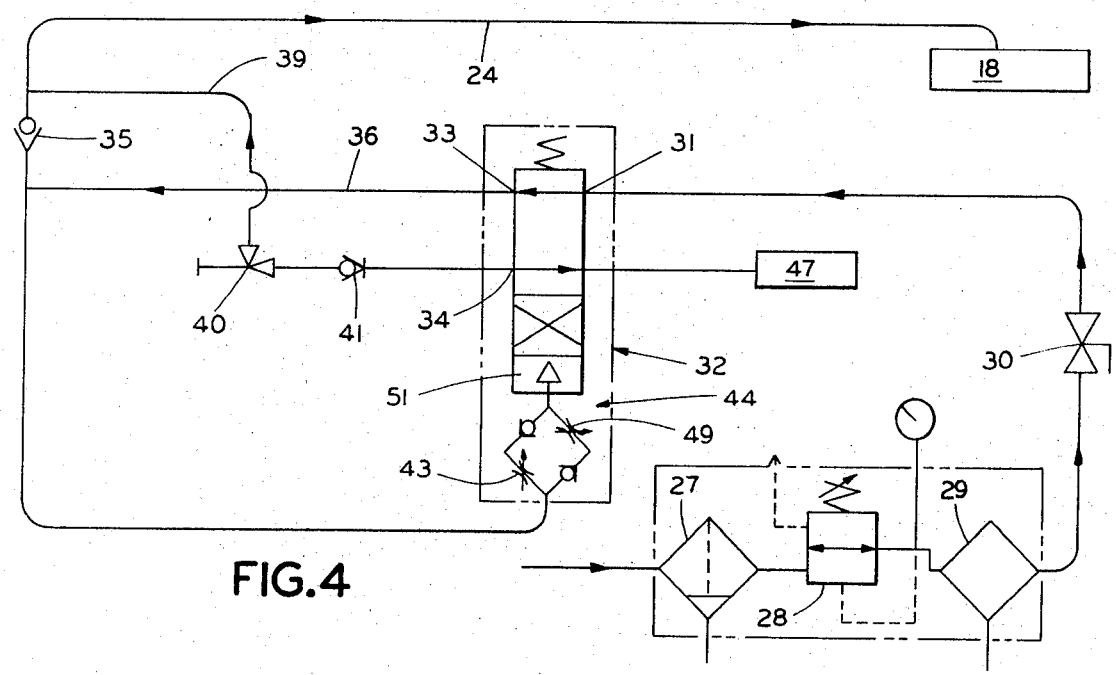
FIG. 4 is a schematic diagram of the pneumatic control system of FIG. 1 in one condition of operation.
Figure 5:
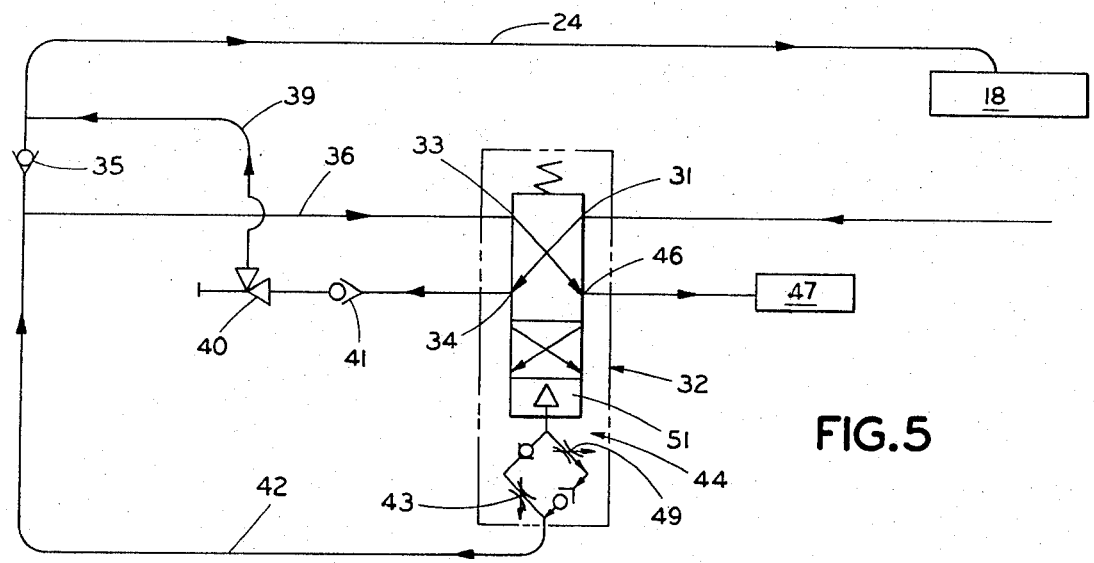
FIG. 5 is a schematic diagram of the pneumatic control system of FIG. 1 in another condition of operation.

From the valve 30 air under pressure is fed to a main inlet port 31 of a four-way poppet valve with automatic time delay operation 32 of the type sold by C.A. Norgren Co. of Littleton, Colorado. The valve 32 has two operating positions, a normally open position as shown in FIG. 4 in which the inlet 31 is connected to an outlet 33 and the other position as shown in FIG. 5 in which the inlet 31 is connected to an outlet port 34. The port 33 is connected to a flow check valve 35 and to a conduit 36 through a T-fitting 37. The outlet side of the check valve 35 is connected through a T-fitting 38 to the conduit 24, also shown in FIG. 3, and this to the inlet of the vibrator 18. The outlet side of the check valve 35 is also connected through the T-fitting 38 and a conduit 39 to a manually adjustable flow control valve 40. The valve 40 is preferably a needle valve having a control knob thereon, and the outlet therefrom is connected by a check valve 41 to the outlet port 34 of the main control valve 32.

It may thus be seen that the valve 32 is in the operating position shown in FIG. 4 air flows through the check valve 35 to the vibrator 18. In the other operating position, as shown in FIG. 5, air flows at a reduced pressure to the vibrator through the flow control valve 40. While the pressure values of the air supplied to the vibrator will vary with the particular filter design and use, a high pressure value of about 80 p.s.i. and a low pressure value of between 20 and 40 p.s.i. with a dwell time of one-half second in each position provides a good removal of a normal filter cake in from 5 to 30 seconds.

Figure 1:
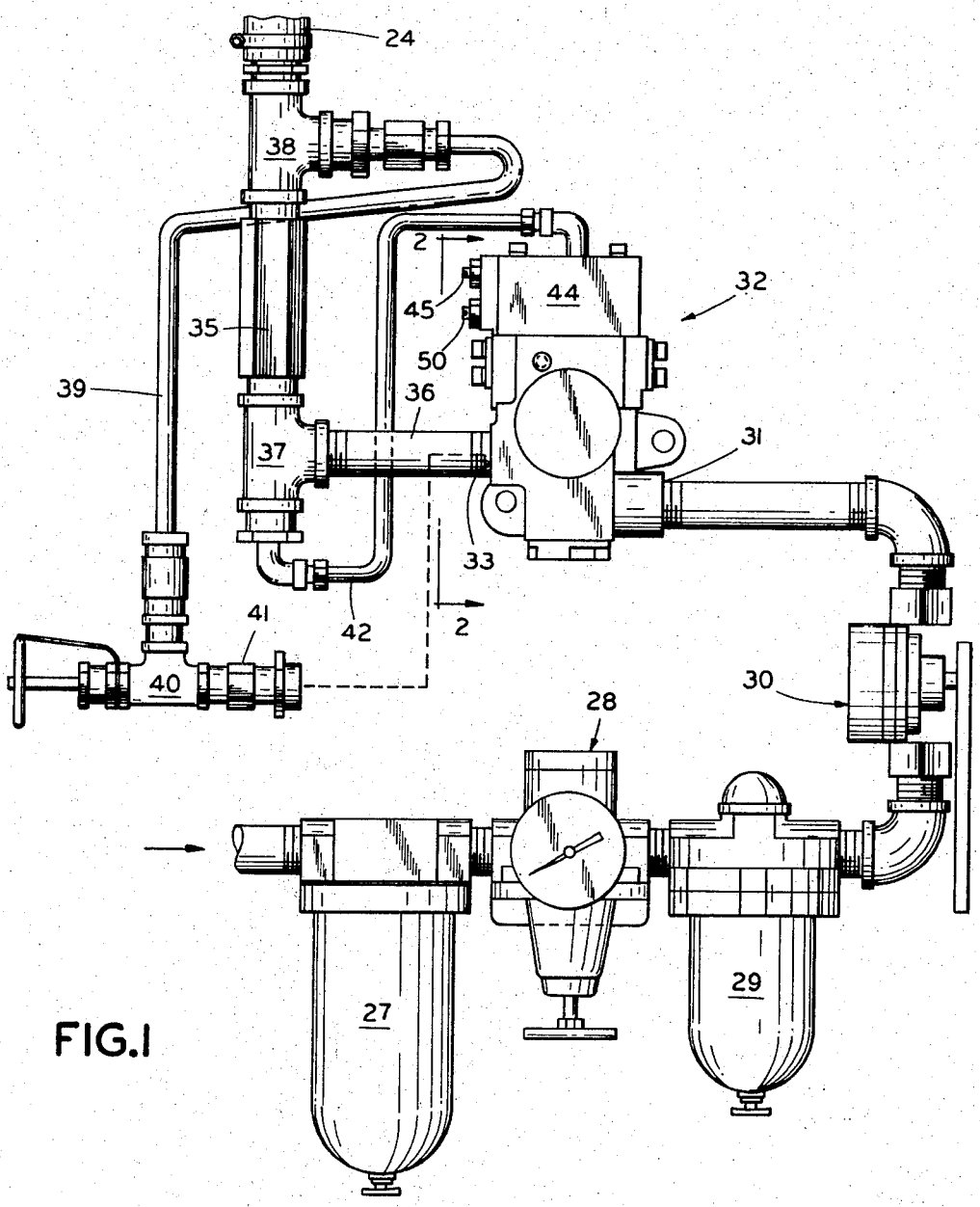
FIG. 1 is an elevational view, partly schematic of a modulated pressure control system embodying the present invention.
Figure 2:
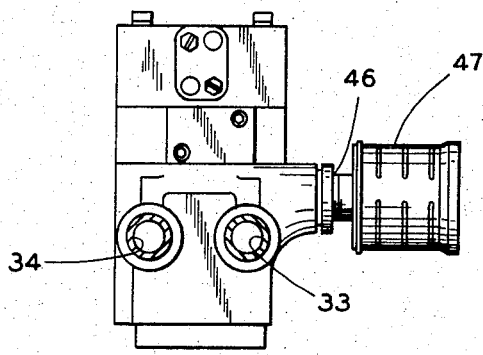
FIG. 2 is a sectional view of a portion of FIG. 1 taken along the line 2—2 thereof.

In order to operate the valve 32 automatically between the two operating positions, a pneumatically operated timing unit 44 is incorporated in the valve 32 and is supplied with air through the line 36 and a line 42 when the valve 32 is positioned to interconnect the ports 31 and 33. An adjusting screw 45 is connected to a flow control valve 43 in the unit 44 to control the rate of flow of air into an accumulating chamber 51 to thereby adjust the length of time during which the valve 32 remains in the position connecting inlet 31 to outlet 33 as shown in FIG. 4. When the valve 32 shifts to its other operating position as shown in FIG. 5 with inlet 31 connected to outlet 34, outlet 33 is connected through the valve 32 to an exhaust outlet 46 over which a muffler 47 is mounted. With the valve 32 in this second position supplying air at a reduced pressure to the vibrator 18 through the control valve 40, the air accumulated in the accumulting chamber 51 is bled off through an orifice valve 49 including an adjustment screw 50 (FIG. 2). The valve 49 is thus used to set the length of time during which air supplied to the vibrator 18 at the reduced pressure value as set by the valve 40.

Figure 6:
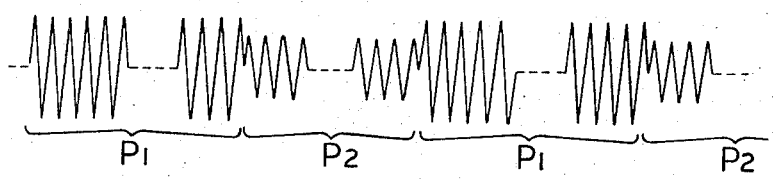
FIG. 6 is an illustration of a waveform applied to the filter leaves of FIG. 3 by the control system of FIG. 1.

The valve 32 is of the quick operating type whereby it abruptly switches from one position to the other which the result that the vibrator 18 is sequentially operated at the high and low pressure values whenever the valve 30 is open. Whe operated at the high pressure value as determined by the pressure regulator 28, the vibrator 18 vibrates at a first frequency and at a first amplitude as shown at $P_1$ in FIG. 6. When operated at the low pressure value as determined by the setting of the control valve 40, the vibrator 18 vibrates at a lower frequency and at a lower amplitude as shown at $P_2$ in FIG. 6. As a result of these sequentially applied wave patterns, waves travel across the perforated surfaces of the filter leaves 14 to dislodge the filter cake therefrom more completely and in a substantially shorter time than is the case when the vibrator 18 is operated at a single frequency and a single amplitude. Observation of a filter leaf during vibration by the system of the present invention shows waves moving across the faces of the leaf as contrasted to the standing wave pattern generally associated with filter leaves vibrated in the prior art manner.

Figures 7, 8:
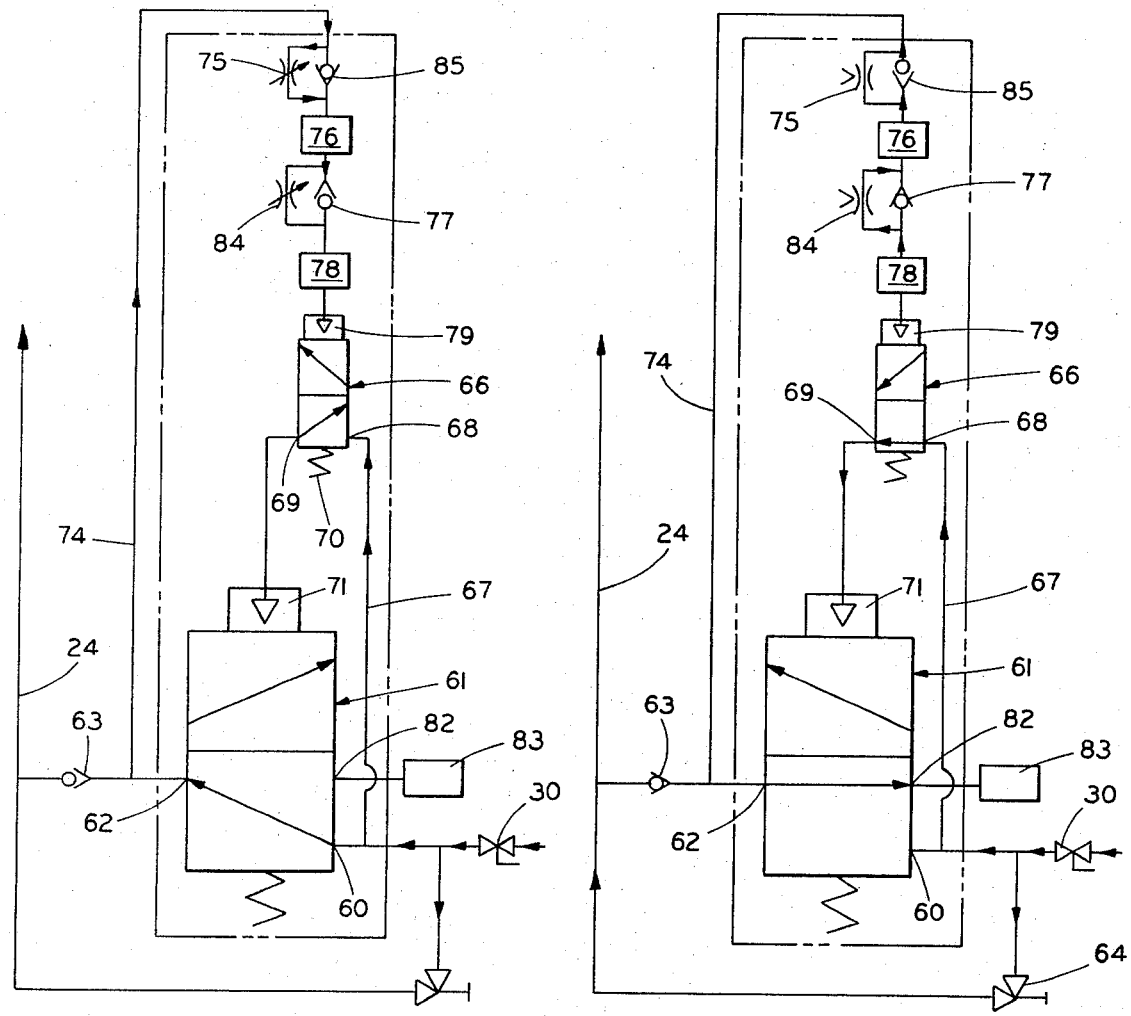
FIGS. 7 and 8 are schematic diagrams of a pneumatic control system which may be used in place of the control system shown in FIGS. 1 and 2, FIG. 7 showing the control system in one condition of operation and FIG. 8 showing the same control system in another condition of operation.

Referring now to FIGS. 7 and 8, there is shown in schematic form another control system for automatically supplying air at sequentially different pressures to the vibrator 18. FIG. 7 illustrates the system in the normally open, first position and FIG. 8 illustrates the system in the second position. Air from the quick opening valve 30 at a constant pressure controlled by the regulator 28 is supplied to a main inlet port 60 of a threeway poppet valve 61. With the valve 61 in the normally open position as shown in FIG. 7, the inlet port 60 is connected to an outlet port 62 which is connected to the conduit 24 of FIG. 3 through a check valve 63. Air from the valve 30 is also connected through an adjustable, restrictive flow control valve 64 to the conduit 24 where it is combined with the air from the outlet port 62. With the valve 61 in the other, normally closed position, the inlet port 60 is closed whereby the only flow of air to the conduit 24 is through the needle valve 64 and, therefore, at a reduced pressure.

In order to automatically operate the valve 61, a pilot valve 66 is supplied with air from a conduit 67 connected to the downstream side of the valve 30. More particularly, the pilot valve 66 has an inlet port 68 and an outlet port 69 which is normally closed. The inlet port 68 is connected to the conduit 67 and the outlet port 69 is connected to the operating port of the accumulating chamber 71 of the valve 61. In the normally closed position as shown in FIG. 7 the valve element of the valve 61 is biased into the normally open position by a spring 70.

In order to controllably open the pilot valve 66, the outlet port 62 is connected by a conduit 74 and a needle type adjustable orifice valve 75 to an accumulating chamber 76 which is connected through a check valve 77 to a second accumulating chamber 78 connected to an operating air chamber 79 for the valve element of the pilot valve 66. Accordingly, when the start valve 30 is opened, the valves 61 and 66 are in the positions shown in FIG. 7 whereby high pressureflows through the check valve 63 to the vibrator. At the same time air bleeds through the orifice valve 75 into the accumulator chamber 76 and thence into the chamber 78 until the pressure in the operating chamber 79 is sufficient to open the pilot valve 66. When the pilot valve 66 opens, as shown in FIG. 8, air flows from the inlet port 68 to the port 69 and thence to the operating chamber of the valve 61 to move the valve member thereof into the closed position. When in the closed position, the port 62 is connected to an exhaust port 82 over which a muffler 83 is mounted. When in this position air flows out of the pilot valve operating chamber 79 and the accumulator chamber 78 through an adjustable orifice valve 84 to the chamber 76 and from the chamber 76 through a check valve 85 and the line 74 to the valve 61 from which it passes through the muffler 83 to the atmosphere. When the pressure in the pilot valve operating chamber 79 falls below a predetermined value, the pilot valve closes and the valve 61 opens. The length of time during which the valve 61 is open is thus determined by the setting of the orifice valve 75 and the length of time during which the valve 61 is closed is determined by the setting of the orifice valve 84, both of which settings are adjustable.

There is thus provided in accordance with the present invention a method and apparatus for generating in filter leaves mechanical waves at different frequencies and amplitudes. As described, both the amplitude and frequency of vibration increases with an increase in operating pressure to the vibrator. Experimentaion indicates, however, that the change in amplitude is substantially dependent on both leaf design and on the nature of the filter cake and with some types of cakes and leaf design the amplitude of vibration is actually less at the higher operating pressure.

With the system of the present invention the low pressure control valve 40 in FIGS. 1-4 can be completely closed whereby the vibrator 18 generates brief bursts at the frequency and amplitude determined by the high pressure setting with no vibration occurring during the intermediate period. Under some conditions satisfactory cleaning of the filter elements can be achieved in this manner.

While the present invention has been described in connection with particular embodiments thereof, it will be understood that those skilled in the art may make changes and modifications without departing from the true spirit and scope thereof. Accordingly, the appended claims are intended to cover all such changes and modifications as fall within the true spirit and scope of the present invention.

What is claimed is:

1. Apparatus for vibrating a filter element, comprising
   vibrator means for vibrating at a first frequency in response to the application thereto of fluid at a first pressure, and for vibrating at a second frequency in response to the application thereto of fluid at a second pressure,
   means connecting said vibrator means to said filter elements,
   first and second conduits connected between a source of fluid under pressure and said vibrator,
   a restrictive orifice in one of said conduits and
   means for alternately closing said conduits including,
   a valve having an inlet connected to said source of fluid, first and second outlets respectively connected to said first and second conduits, and a valve element movable between a first position wherein said inlet is connected to said first outlet and a second position wherein said inlet is connected to said second outlet.

2. Apparatus according to claim 1, comprising
   fluid operated means for moving said valve element between said first and second positions, and
   means for adjusting the time periods during which said valve element is in each of said positions.

3. Apparatus according to claim 2, comprising pressure regulating means connected between said valve and said source of fluid under pressure, and
   means connecting said first outlet to said fluid operated means.

4. Apparatus according to claim 2 wherein said pressure regulating means comprises
   means for adjusting the pressure at the outlet thereof.

5. In combination with a pressure filter having a plurality of filter elements mounted in a filter tank,
   vibrator means having a frequency of vibration which varies with the pressure of an operating fluid supplied thereto,
   means connecting said vibrator means to said filter elements to vibrate said elements,
   conduit means for supplying operating fluid to said vibrator means at substantially different pressures, and
   presettable means for alternately supplying said operating fluid to said conduit means at two substantially different pressure valves,
   said presettable means including an adjustable timer for presetting the rate of alternation between said pressure values of the operating fluid supplied to said conduit means and thus to said vibrator means.

6. In the combination set forthe in claim 5, said presettable means comprising
   adjustable means for presetting the relative durations of application of said pressure values to said vibrator means.

7. In the combination set forth in claim 5, said presettable mens comprising
   adjustable means for presetting said pressure values.

8. In the combination set forth in claim 5, said presettable means comprising
   means for abruptly changing the pressures of said operating fluid supplied to said conduit means from one of said values to the other.

9. In the combination set forth in claim 8,
   said vibrator means and said presettable means are pneumatically operated, and
   said means for abruptly changing the pressure of said fluid is a pneumatically operated pilot valve.

* * * * *

UNITED STATES PATENT OFFICE
CERTIFICATE OF CORRECTION

Patent No. 3,867,291             Dated February 18, 1975

Inventor(s) HENRY SCHMIDT, JR., and BRUCE DURHAM

It is certified that error appears in the above-identified patent and that said Letters Patent are hereby corrected as shown below:

Column 1, line 46, "not" should be --no--
Column 1, line 52, before "given" insert --a--
Column 2, line 23, "cieny" should be --iency--
Column 3, line 4, "impact" should be --impart--
Column 3, line 37, "this" should be --thus--
Column 3, line 45, after "that" insert --when--
Column 4, line 10, after "air" insert --is--
Column 4, line 14, "which" should be --with--
Column 4, line 16, "Whe" should be --When--

Column 6, line 40, "valves" should be --values--
Column 6, line 51, "mens" should be --means--

Signed and Sealed this thirtieth Day of December 1975

[SEAL]

Attest:

RUTH C. MASON
Attesting Officer

C. MARSHALL DANN
Commissioner of Patents and Trademarks